US011907188B2

United States Patent
Pu et al.

(10) Patent No.: US 11,907,188 B2
(45) Date of Patent: Feb. 20, 2024

(54) METHOD, DEVICE, AND PROGRAM PRODUCT FOR MANAGING DATA PATTERN

(71) Applicant: EMC IP Holding Company LLC, Hopkinton, MA (US)

(72) Inventors: Weilan Pu, Chengdu (CN); Jian Kang, Chengdu (CN); Chi Chen, Chengdu (CN); Wen Chen, Sichuan (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 39 days.

(21) Appl. No.: 17/239,950

(22) Filed: Apr. 26, 2021

(65) Prior Publication Data

US 2022/0229823 A1 Jul. 21, 2022

(30) Foreign Application Priority Data

Jan. 20, 2021 (CN) .......................... 202110075083.0

(51) Int. Cl.
*G06F 16/00* (2019.01)
*G06F 16/215* (2019.01)
(52) U.S. Cl.
CPC ................................. *G06F 16/215* (2019.01)

(58) Field of Classification Search
None
See application file for complete search history.

(56) References Cited

U.S. PATENT DOCUMENTS

| 9,619,497 | B2 | 4/2017 | Jung et al. |
|---|---|---|---|
| 9,690,501 | B1 | 6/2017 | Chopra et al. |
| 10,361,802 | B1 | 7/2019 | Hoffberg-Borghesani et al. |
| 2020/0026710 | A1 | 1/2020 | Przada et al. |
| 2020/0250003 | A1 | 8/2020 | Yang et al. |

*Primary Examiner* — Bai D Vu
(74) *Attorney, Agent, or Firm* — BainwoodHuang

(57) ABSTRACT

Techniques for managing data patterns involve: acquiring multiple sets of data patterns respectively associated with multiple collection devices, wherein a set of data patterns in the multiple sets of data patterns represent patterns of duplicate data in data from one of the multiple collection devices; dividing the multiple collection devices into multiple groups based on clusters of the multiple sets of data patterns; and determining, based on sets of data patterns associated with collection devices in a group in the multiple groups, a set of shared data patterns for sharing among the collection devices in the group. Accordingly, data patterns that can be shared among multiple collection devices can be determined in a more accurate and effective manner, thereby facilitating the removal of duplicate data from the multiple collection devices.

11 Claims, 9 Drawing Sheets

METHOD, DEVICE, AND PROGRAM PRODUCT FOR MANAGING DATA PATTERN

CROSS-REFERENCE TO RELATED APPLICATION

This application claims priority to Chinese Patent Application No. CN202110075083.0, on file at the China National Intellectual Property Administration (CNIPA), having a filing date of Jan. 20, 2021, and having "METHOD, DEVICE, AND PROGRAM PRODUCT FOR MANAGING DATA PATTERN" as a title, the contents and teachings of which are herein incorporated by reference in their entirety.

TECHNICAL FIELD

Implementations of the present disclosure relate to data processing and, more particularly, to a method, a device, and a computer program product for managing data patterns of data from collection devices.

BACKGROUND

With the development of data collection technologies and network technologies, it is now possible to deploy various types of collection devices in a variety of application environments in order to monitor parameters of the application environments. For example, in a road management environment, collection devices can be deployed at various geographical locations in a road to monitor the road condition. In a production control environment, collection devices can be deployed at various locations in a production line to monitor the operation of the production line, and so on. Data from the collection devices can be transmitted to a data center for post-processing and analysis. It will be understood that there may be duplicate data in the collected data (hereinafter, patterns of the duplicate data will be referred to as data patterns), and these duplicate data will cause waste of transmission bandwidth and storage space. At this point, how to manage data patterns of the collected data in a more effective manner becomes a hot research topic.

SUMMARY OF THE INVENTION

Therefore, it is desirable to develop and implement a technical solution for managing data patterns in a more effective manner. It is expected that this technical solution can manage data patterns of data from multiple different collection devices in a more convenient and effective manner. Further, it is expected that multiple data patterns can be utilized to improve the efficiency of data transmission and storage.

According to a first aspect of the present disclosure, a method for managing data patterns is provided. This method includes: acquiring multiple sets of data patterns respectively associated with multiple collection devices, wherein a set of data patterns in the multiple sets of data patterns represent patterns of duplicate data in data from one of the multiple collection devices; dividing the multiple collection devices into multiple groups based on clusters of the multiple sets of data patterns; and determining, based on sets of data patterns associated with collection devices in a group in the multiple groups, a set of shared data patterns for sharing among the collection devices in the group.

According to a second aspect of the present disclosure, an electronic device is provided, including: at least one processor; a volatile memory; and a memory coupled to the at least one processor, the memory having instructions stored therein, wherein the instructions, when executed by the at least one processor, cause the device to execute the method according to the first aspect of the present disclosure.

According to a third aspect of the present disclosure, a computer program product is provided, which is tangibly stored on a non-transitory computer-readable medium and includes machine-executable instructions, wherein the machine-executable instructions are used to perform the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of example rather than limitation. In the accompanying drawings, FIG. 1 schematically illustrates a block diagram of an application environment in which example implementations of the present disclosure may be implemented.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Hereinafter, preferred implementations of the present disclosure will be described in more detail with reference to the accompanying drawings. Although the preferred implementations of the present disclosure are shown in the accompanying drawings, it should be understood that the present disclosure may be implemented in various forms and should not be limited by the implementations set forth herein. Rather, these implementations are provided so that the present disclosure will be more thorough and complete, and the scope of the present disclosure will be fully conveyed to those skilled in the art.

The term "include" and variants thereof used herein indicate open-ended inclusion, that is, "including but not limited to." Unless specifically stated, the term "or" means "and/or." The term "based on" means "based at least in part on." The terms "one example implementation" and "one implementation" mean "at least one example implementation." The term "another implementation" means "at least one further implementation." The terms "first," "second," and the like may refer to different or the same objects. Other explicit and implicit definitions may also be included below.

Figure 1:
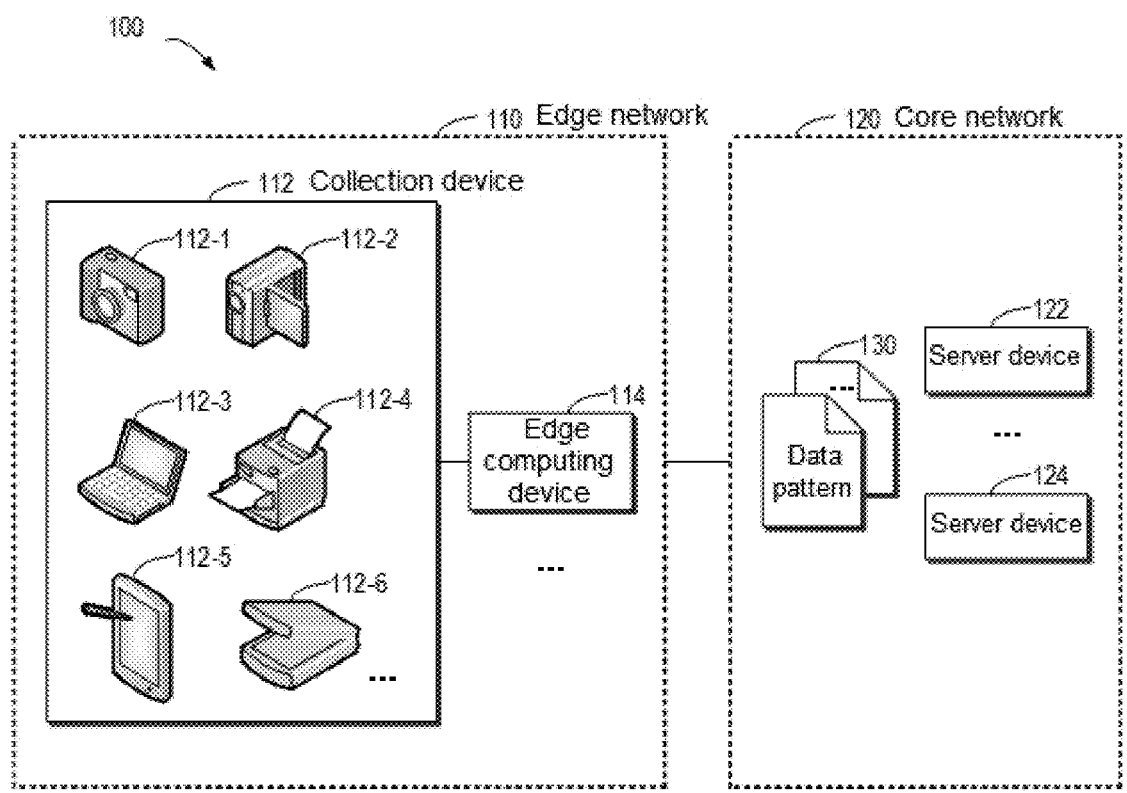

For ease of description, an application environment according to an example implementation of the present disclosure will be first described with reference to FIG. 1. FIG. 1 schematically illustrates a block diagram of application environment 100 in which example implementations of the present disclosure may be implemented. For example, an example implementation according to the present disclosure may be implemented in application environment 100 of the Internet of Things. Application environment 100 may include two parts, edge network 110 and core network 120. Edge network 110 may include edge computing device 114 and multiple collection devices 112-1, 112-2, 112-3, 112-4, 112-5, 112-6, etc. (collectively referred to as collection device 112) that are connected to edge computing device 114. Collection device 112 may have various types, e.g., a camera, a camcorder, a fax machine, a scanner, etc. Edge computing device 114 can transmit data from various collection devices 112 to server devices 122, . . . , 124, etc., in core network 120 for storage and subsequent further processing.

It will be understood that there may be duplicate content in the data from collection device 112. Technical solutions have been proposed for extracting data patterns from collected data. A data pattern library can be predefined, and when a data segment in collected data is found to match a data pattern in the data pattern library, the identifier of that data pattern can be used to replace the data segment. Multiple data patterns 130 can be deployed at core network 120. The duplicate content in the received data can be removed based on multiple data patterns 130. In this manner, data can be stored in a more effective manner.

Although the above technical solution can improve the storage efficiency at core network 120, the data transmitted from edge network 110 to core network 120 is raw data including duplicate content, and the transmission process will consume a high bandwidth. In another technical solution, data patterns for de-duplication can be deployed in edge computing device 114. However, a large number (e.g., tens of thousands or even more) of data patterns may exist, and the performance of removing duplicate data at edge computing device 114 is not ideal due to the limitations of storage space and computing resources of edge computing device 114.

Figure 2:
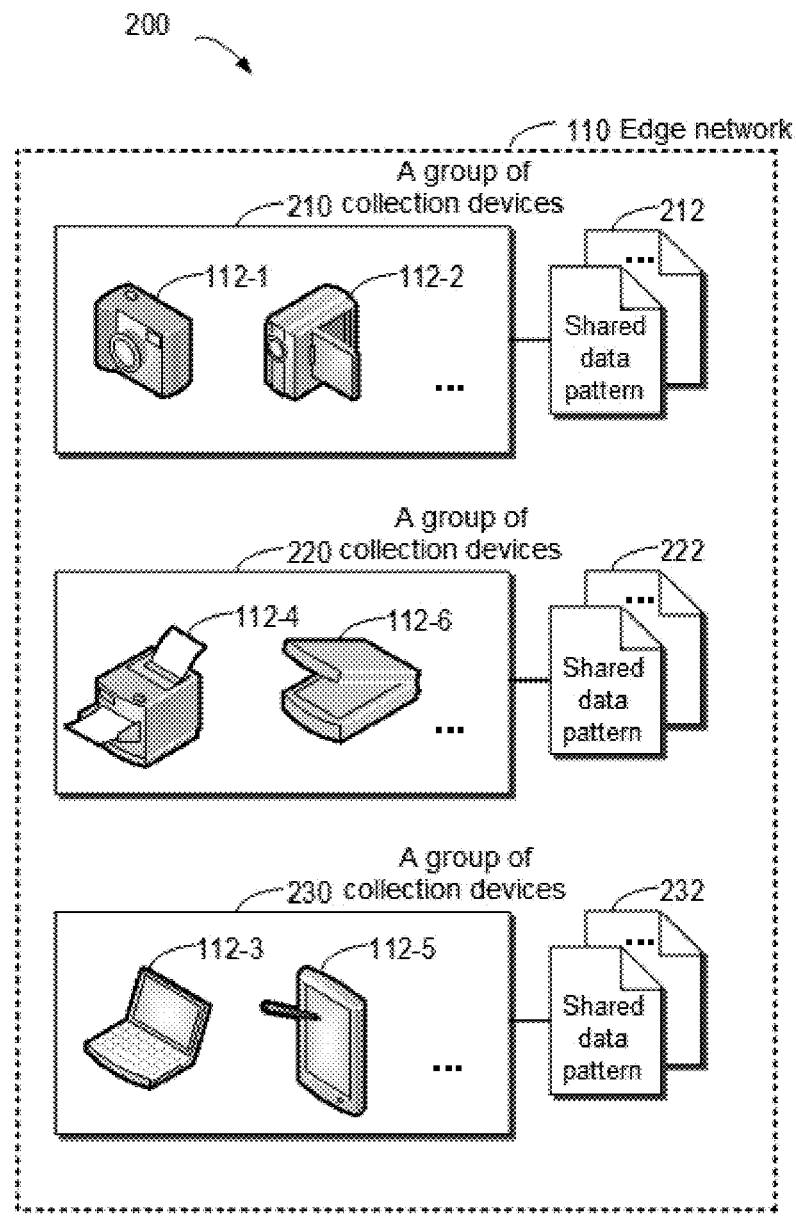
FIG. 2 schematically illustrates a block diagram of a process for managing data patterns according to example implementations of the present disclosure.

To address the above defects, implementations of the present disclosure provide a technical solution for managing data patterns. According to an example implementation of the present disclosure, a technical solution is proposed for classifying multiple collection devices 112. Hereinafter, an overview of an example implementation according to the present disclosure will be described with reference to FIG. 2. FIG. 2 schematically illustrates a block diagram of process 200 for managing data patterns according to example implementations of the present disclosure. As shown in FIG. 2, multiple collection devices 112 in edge network 110 can be divided into different groups. For example, a group of collection devices 210 may include collection devices 112-1, 122-2, etc.; a group of collection devices 220 may include collection devices 112-4, 122-6, etc.; and a group of collection devices 230 may include collection devices 112-3, 122-5, etc.

A respective shared data pattern can be determined for each group of collection devices, for example, the group of collection devices 210 may have shared data pattern 212. A shared data pattern here means that data from part and/or all of collection devices 112-1, 112-2, etc. in the group of collection devices 210 includes shared data pattern 212. According to an example implementation of the present disclosure, shared data pattern 212 may include one or more data patterns. As shown in FIG. 2, the group of collection devices 220 may have shared data pattern 222, and the group of collection devices 230 may have shared data pattern 232. With the example implementation of the present disclosure, instead of maintaining a large number of data patterns at edge computing device 114 at edge network 110, it is possible to only maintain a shared data pattern for one group of collection devices. In this manner, the burden on edge computing device 114 can be reduced, so that edge computing device 114 can remove duplicate portions from collection devices 112 prior to transmitting data, thereby reducing the requirements for transmission bandwidth.

Figure 3:
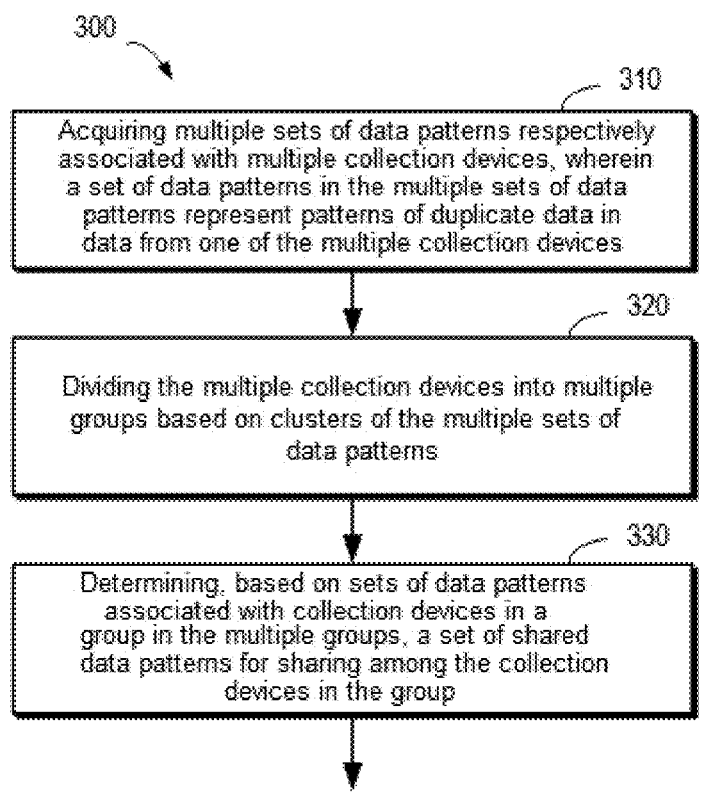
FIG. 3 schematically illustrates a flow chart of a method for managing data patterns according to example implementations of the present disclosure.

Hereinafter, more details of an example implementation according to the present disclosure will be described in detail with reference to FIG. 3. FIG. 3 schematically illustrates a flow chart of method 300 for managing data patterns according to example implementations of the present disclosure. At block 310, multiple sets of data patterns respectively associated with multiple collection devices are acquired. Here, a set of data patterns in the multiple sets of data patterns represent patterns of duplicate data in data from one of the multiple collection devices.

Figure 4:
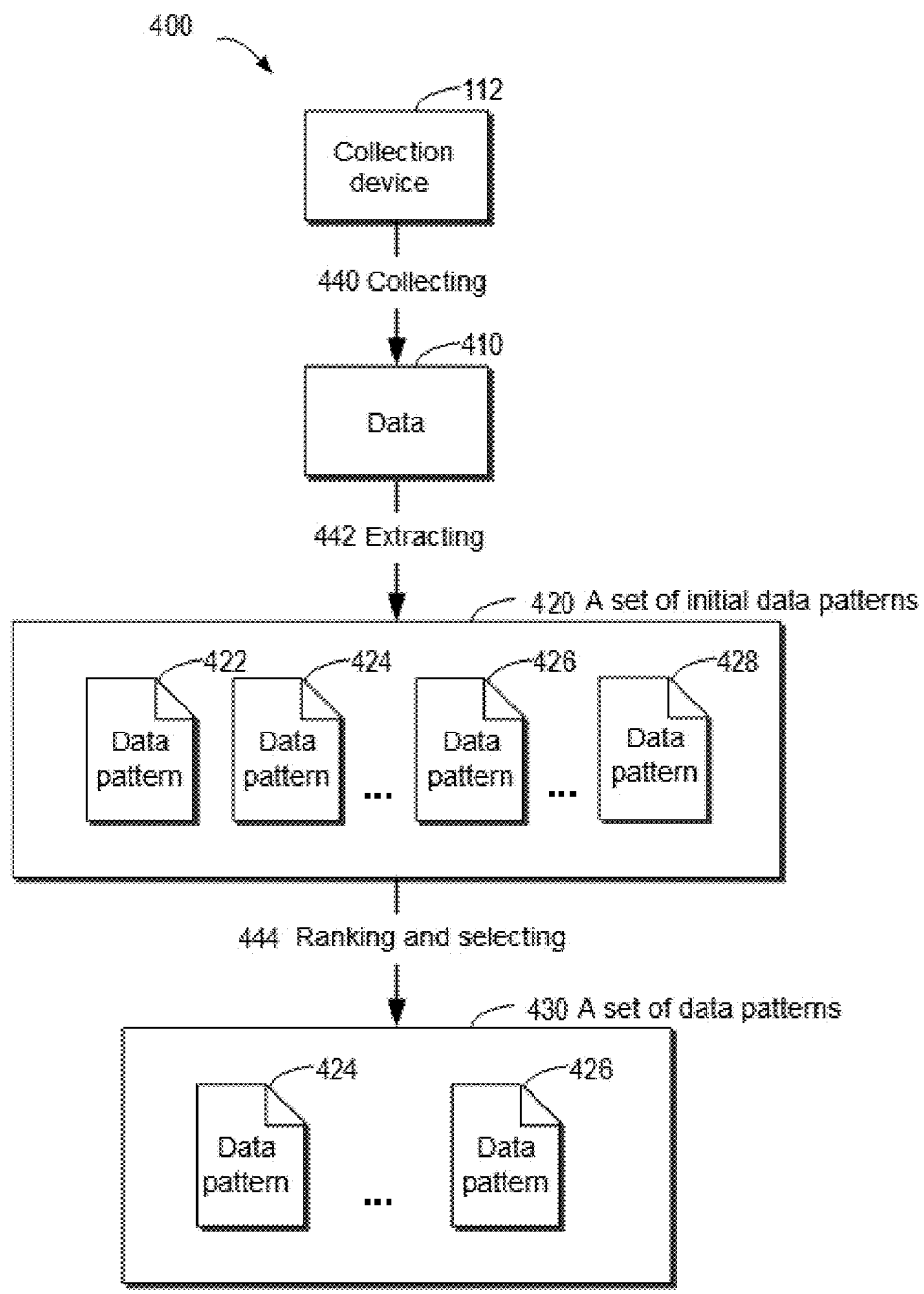
FIG. 4 schematically illustrates a block diagram of a process for acquiring a set of data patterns associated with a collection device according to example implementations of the present disclosure.

Hereinafter, a process of acquiring a set of data patterns from one collection device 112 will be described with reference to FIG. 4, and multiple sets of data patterns can be acquired respectively from the multiple collection devices in a similar manner. FIG. 4 schematically illustrates a block diagram of process 400 for acquiring a set of data patterns associated with a collection device according to example implementations of the present disclosure. In FIG. 4, as indicated by arrow 440, data 410 can be collected from collection device 112. It will be understood that the type of data 410 is not limited in the context of the present disclosure. Rather, depending on the type of collection device 112, data 410 may be of multiple types, for example, image, audio, video, text, and so on.

According to an example implementation of the present disclosure, as indicated by arrow 442, a set of initial data patterns 420 associated with collection device 112 can be extracted. Specifically, data patterns that occur in data 420 can be acquired based on a variety of pattern extraction techniques that have been developed currently and/or will be developed in the future. For example, data patterns 422, 424, . . . , 426, . . . , and 428 can be acquired. Specifically, a predetermined length of time can be specified. For example, data 410 in the previous month (or another length of time) can be acquired, and the number of occurrences of the data patterns in the past month can be counted.

As indicated by arrow 444, a set of initial data patterns 420 can be ranked based on the number of occurrences of data patterns in the set of initial data patterns 420 in data 410. Assuming that q data patterns are collected, n data patterns with the highest rankings can be selected from the ranked multiple data patterns. As shown in FIG. 4, data patterns 424, . . . , 426, etc. can be selected. According to an example implementation of the present disclosure, similar operations can be performed for data from each collection device, and a set of n data patterns with the highest rankings can be acquired from each collection device 112, respectively.

Hereinafter, the description will return to FIG. 3 to describe how to process the collected multiple sets of data patterns. At block 320, the multiple collection devices are divided into multiple groups based on clusters of the multiple sets of data patterns. It will be understood that each set of data patterns may include n data patterns, and assuming that there are m collection devices, then n data patterns can be acquired for each collection device among the m collection devices. According to an example implementation of the present disclosure, a unique identifier can be used to represent each data pattern. For example, the number of bits p of an identifier can be specified in advance and an integer between 0 and $2^p$ can be used to represent an identifier of a data pattern.

Figure 5:
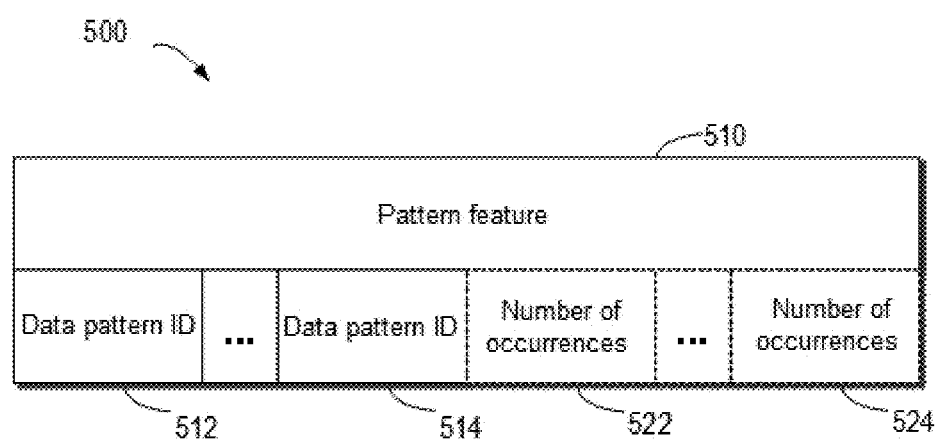
FIG. 5 schematically illustrates a block diagram of a data structure of a pattern feature according to example implementations of the present disclosure.

According to an example implementation of the present disclosure, multiple pattern features of multiple sets of data patterns can be generated respectively based on the multiple sets of data patterns. Hereinafter, more details about a pattern feature will be described with reference to FIG. 5. FIG. 5 schematically illustrates a block diagram of data structure 500 of a pattern feature according to example implementations of the present disclosure. The pattern feature shown in FIG. 5 can be generated for each set of data patterns. As shown in FIG. 5, for a set of data patterns from given collection device 112, a pattern feature can be generated based on the identifier (ID) of each data pattern included in the set of data patterns. Specifically, pattern feature 510 may include data pattern ID 512, . . . , and data pattern ID 514. At this point, the pattern feature may include identifiers of n data patterns.

It will be understood that the numbers of occurrences of the data patterns in the data are different, and for a data pattern with a high number of occurrences, removing duplicate data based on that data pattern is more helpful to reduce the data amount. Thus, the pattern feature can be determined based on the numbers of occurrences of the data patterns. According to an example implementation of the present disclosure, for a set of data patterns, a pattern feature of the set of data patterns can be generated based on data patterns in the set of data patterns and the numbers of occurrences of the data patterns in the data. As shown in FIG. 5, data pattern 510 may further include the numbers of occurrences 522, . . . , and 524 of the data patterns.

It will be understood that FIG. 5 only schematically illustrates one data structure of pattern feature 510. According to an example implementation of the present disclosure, the pattern feature can be generated based on other methods. For example, pattern feature 510 may include multiple fields, each of which may correspond to a data pattern, and the number in each field may indicate the number of occurrences of the data pattern. According to an example implementation of the present disclosure, a pattern feature of a set of data patterns can be generated based on other methods.

Furthermore, the multiple collection devices can be divided into multiple groups based on the multiple pattern features. It will be understood that the pattern features here may have a high dimension and are difficult to cluster, so that dimension reduction treatment can be performed on the pattern features and the features after dimension reduction can be clustered. According to an example implementation of the present disclosure, the multiple pattern features can be converted respectively to multiple low-dimensional features based on, for example, any of the multidimensional scaling (MDS) algorithm, the principal component analysis (PCA) algorithm, the linear discriminant analysis (LDA) algorithm, the local linear embedding (LLE) algorithm, and so on. Here, the dimension of each low-dimensional feature is lower than that of the original pattern feature.

According to an example implementation of the present disclosure, the pattern features of high dimensions can be reduced to two dimensions or other low dimensions. Then, multiple low-dimensional features can be classified into multiple clusters based on the distances between the multiple low-dimensional features. Here, each cluster may include one or more low-dimensional features, and each low-dimensional feature is associated with one collection device. In this manner, the initial multiple collection devices can be divided into multiple groups.

The division of the multiple collection devices into the multiple groups has been described above, and hereinafter, the process of determining a set of shared data patterns for each of the multiple groups will continue to be described with reference to FIG. 3. At block 330, based on sets of data patterns associated with collection devices in a group in the multiple groups, a set of shared data patterns for sharing among the collection devices in the group are determined. At this point, a group may include one or more collection devices. Hereinafter, more details on determining the shared data patterns will be described with reference to FIG. 6.

Figure 6:
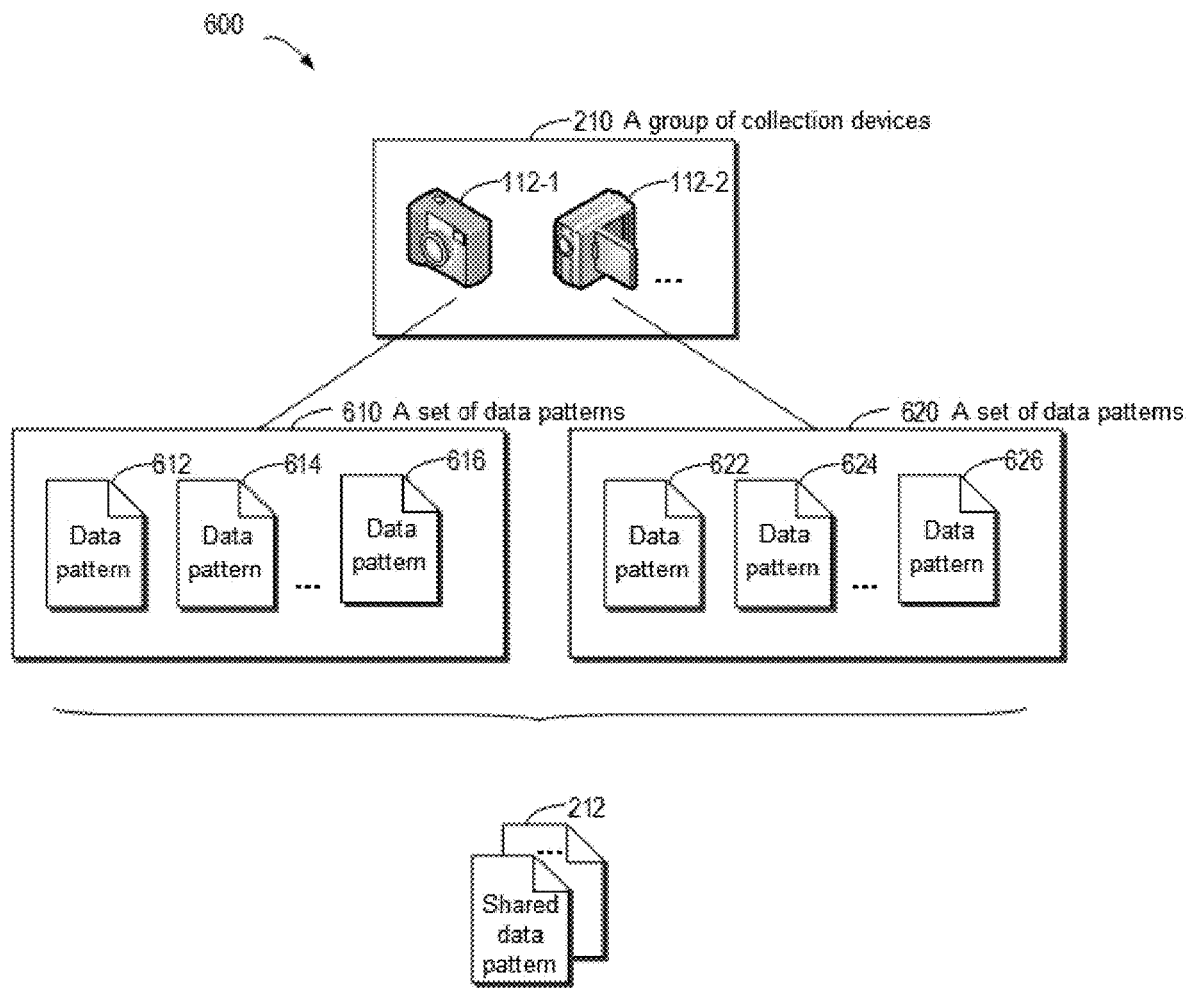
FIG. 6 schematically illustrates a block diagram of a process for acquiring a set of shared data patterns according to example implementations of the present disclosure.

FIG. 6 schematically illustrates a block diagram of process 600 for acquiring a set of shared data patterns according to example implementations of the present disclosure. Although FIG. 6 only schematically illustrates the processing process for a group of collection devices 210, similar processing may be performed for each of the multiple groups. As shown in FIG. 6, one group of collection devices 210 include collection device 112-1, collection device 112-2, . . . . Collection device 112-1 relates to a set of data patterns 610 (including data patterns 612, 614, . . . , and 616), and collection device 112-2 relates to a set of data patterns 620 (including data patterns 622, 624, . . . , and 626).

According to an example implementation of the present disclosure, the numbers of occurrences of data patterns in the sets of data patterns in data from the collection devices in the group can be determined, respectively. Specifically, the numbers of occurrences of data patterns 612, 614, . . . , and 616 in the data from collection device 112-1 can be determined, respectively, and the numbers of occurrences of data patterns 622, 624, . . . , and 626 in the data from collection device 112-2 can be determined, respectively. Further, a set of shared data patterns 212 can be determined based on the numbers of occurrences of the data patterns.

For example, data patterns 612, 614, . . . , 616, 622, 624, . . . , and 626 can be ranked in a descending order of the number of occurrences, and a specified number of data patterns with the highest rankings can be selected.

It will be understood that the greater the number of shared data patterns stored at the edge computing device, the more duplicate data can be removed during processing of the data from collection device 112. In addition, the storage space of edge computing device 114 is limited, making it impossible to store too many shared data patterns at edge computing device 114. At this point, a balance should be made between the amount of duplicate data removed and the storage space occupied by the shared data patterns, so as to determine the number of shared data patterns in a set of shared data patterns.

According to an example implementation of the present disclosure, a set of shared data patterns can also be determined based on an intersection of the sets of data patterns. Specifically, the intersection between data patterns 612, 614, . . . , 616 and data patterns 622, 624, . . . , and 626 can be determined to determine the data patterns that can be shared between two collection devices 112-1 and 112-2.

According to an example implementation of the present disclosure, method 300 can be executed at any computing device in application environment 100. For example, method 300 can be performed at edge computing device 114 in edge network 110. At this point, data from collection device 112 can be processed within edge network 110 to determine shared data patterns. In this manner, the high bandwidth caused by transmitting data to core network 120 can be avoided. For another example, method 300 can be executed at a server device in core network 120. It will be understood that the server device in core network 120 usually has abundant computing resources, and in such manner, data patterns can be processed with greater efficiency, and shared data patterns that can be shared between each group of collection devices can be determined.

Figure 7:
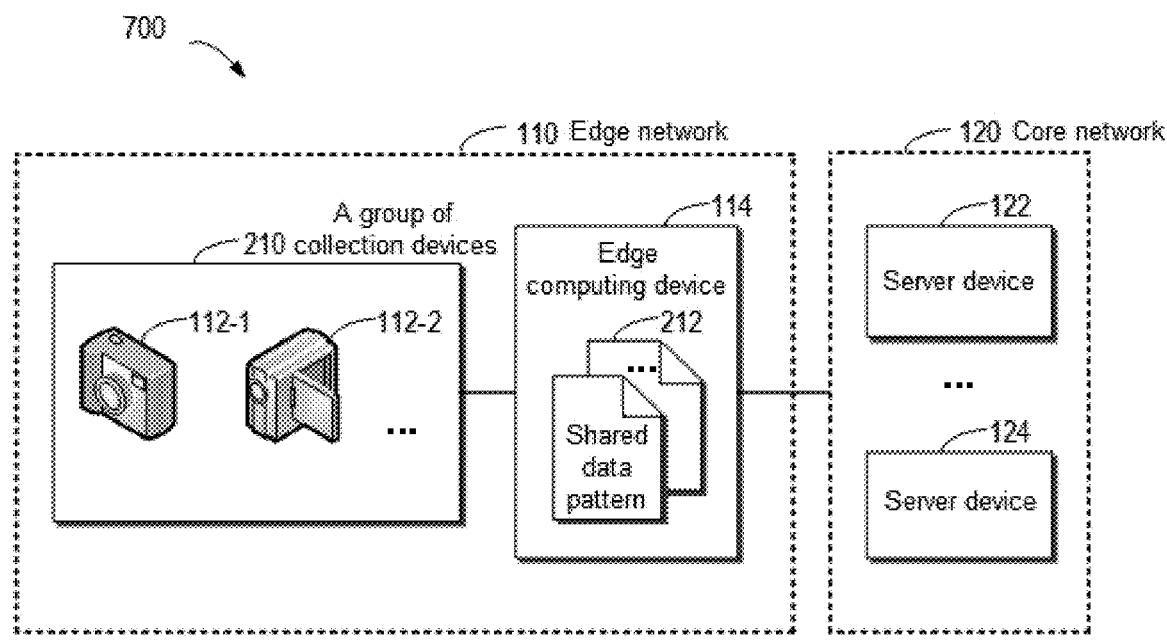
FIG. 7 schematically illustrates a block diagram of the deployment of a set of shared data patterns according to example implementations of the present disclosure.

According to an example implementation of the present disclosure, a set of shared data patterns determined based on method 300 can be distributed to edge computing device 114 in edge network 110. Hereinafter, the process of deploying a set of shared data patterns is described with reference to FIG. 7. FIG. 7 schematically illustrates a block diagram of deployment 700 of a set of shared data patterns according to example implementations of the present disclosure. As shown in FIG. 7, a set of shared data patterns 212 can be deployed to edge computing device 114 in edge network 110. Here, edge computing device 114 is connected to a target collection device (for example, collection devices 112-1, 112-2, etc.) among multiple collection devices in a group.

Figure 8:
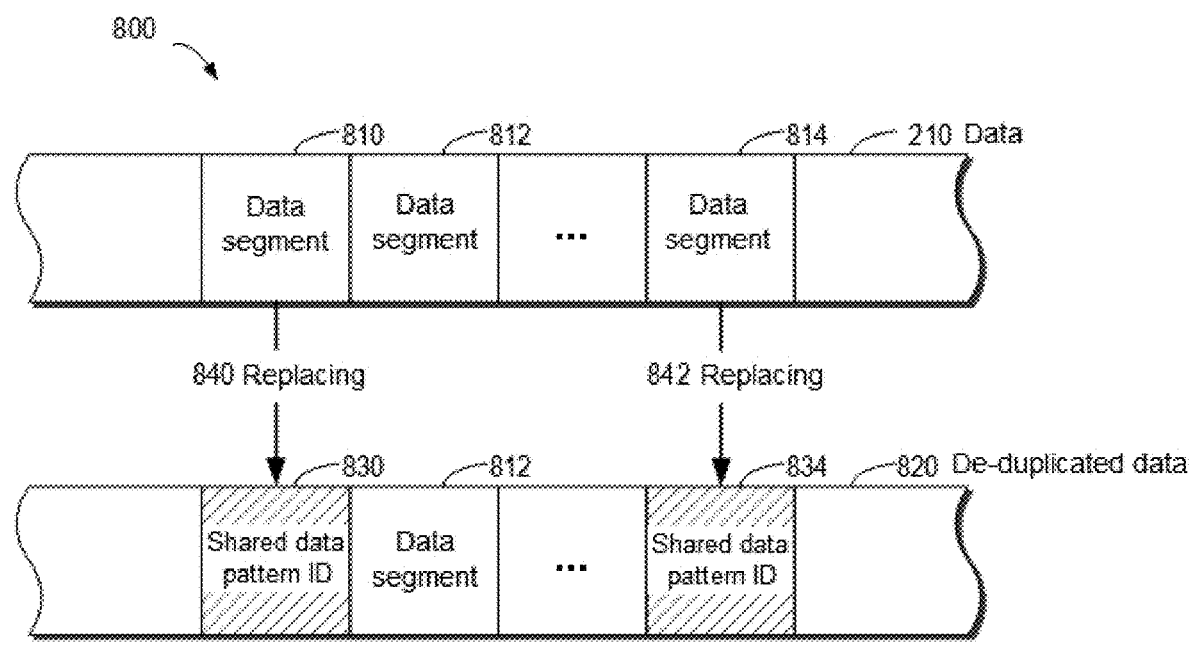
FIG. 8 schematically illustrates a block diagram of a process for generating de-duplicated data according to example implementations of the present disclosure.

The process of determining a set of shared data patterns for each group of collection devices has been described above, and further, edge computing device 114 can generate de-duplicated data of target data from a target collection device based on the set of shared data patterns. Hereinafter, the process of removing duplicate data from the data from collection device 112 based on the shared data patterns will be described with reference to FIG. 8. FIG. 8 schematically illustrates a block diagram of process 800 for generating de-duplicated data according to example implementations of the present disclosure. As shown in FIG. 8, data 210 from collection devices 112 may include multiple data segments 810, 812, . . . , and 814. Each data segment can be compared to a set of shared data patterns to determine if an identifier of a shared data pattern can be used to replace the data segment.

If a given data segment matches a shared data pattern, the identifier of that shared data pattern can be used to replace the given data segment. If the given data segment does not match any of the shared data patterns, the given data segment remains unchanged. FIG. 8 illustrates de-duplicated data 820, wherein de-duplicated data 820 may include shared data pattern identifier 830 (as indicated by arrow 840, shared data pattern identifier 830 is used to replace data segment 810), data segment 812, . . . , and shared data pattern identifier 834 (as indicated by arrow 842, shared data pattern identifier 834 is used to replace data segment 814).

With example implementations of the present disclosure, data segments 810 and 814, etc., in data 210 would be replaced by identifiers of some shared data patterns in a set of shared data patterns. In this manner, the data amount of de-duplicated data 820 will be smaller than that of data 210. This will reduce the overhead of storage resources and bandwidth resources involved in data storage and transmission.

According to an example implementation of the present disclosure, edge computing device 114 can transmit de-duplicated data to a server device that is used to process target data. Assuming that server device 122 in core network 120 is used to process data from a group of collection devices 210, edge computing device 114 can transmit to server device 122 de-duplicated data, from each collection device, from which duplicate data has been removed. With example implementations of the present disclosure, bandwidth requirements between edge network 110 and core network 120 can be reduced, and the workload of data transmission can be reduced.

Examples of the method according to the present disclosure have been described in detail above with reference to FIGS. 2 to 8, and implementations of a corresponding apparatus will be described below. According to an example implementation of the present disclosure, an apparatus for managing data patterns is provided. The apparatus includes: an acquisition module configured to acquire multiple sets of data patterns respectively associated with multiple collection devices, wherein a set of data patterns in the multiple sets of data patterns represent patterns of duplicate data in data from one of the multiple collection devices; a division module configured to divide the multiple collection devices into multiple groups based on clusters of the multiple sets of data patterns; and a determination module configured to determine, based on sets of data patterns associated with collection devices in a group in the multiple groups, a set of shared data patterns for sharing among the collection devices in the group. According to an example implementation of the present disclosure, this apparatus further includes modules for performing other steps in method 300 described above.

Figure 9:
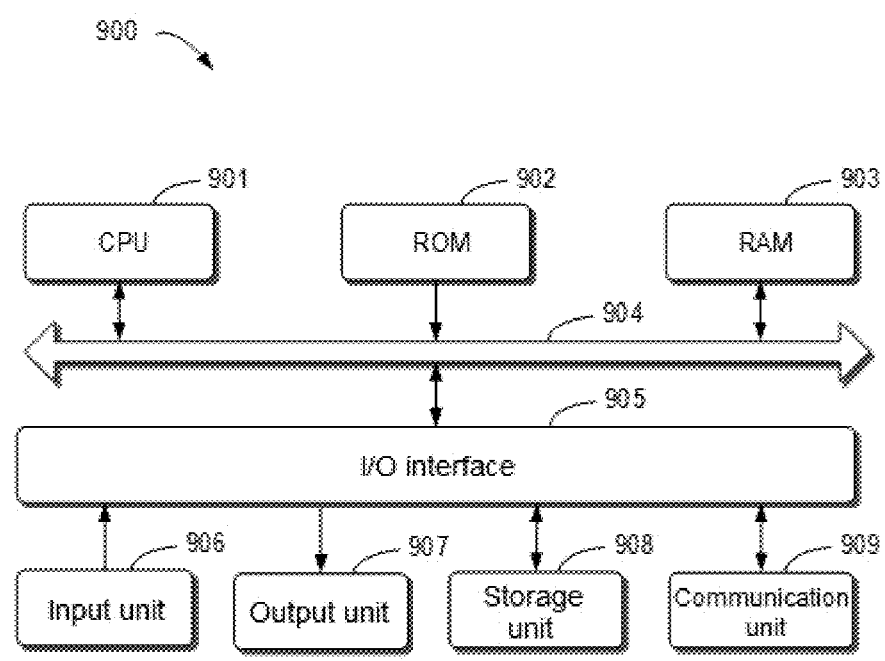
FIG. 9 schematically illustrates a block diagram of a device for managing data patterns according to example implementations of the present disclosure.

FIG. 9 schematically illustrates a block diagram of device 900 for managing data patterns according to example implementations of the present disclosure. As shown in the figure, device 900 includes central processing unit (CPU) 901 that may perform various appropriate actions and processing according to computer program instructions stored in read-only memory (ROM) 902 or computer program instructions loaded from storage unit 908 into random access memory (RAM) 903. Various programs and data required by the operation of device 900 may also be stored in RAM 903. CPU 901, ROM 902, and RAM 903 are connected to one another through bus 904. Input/output (I/O) interface 905 is also connected to bus 904.

A plurality of components in device 900 are connected to I/O interface 905, including: input unit 906, such as a keyboard and a mouse; output unit 907, such as various types of displays and speakers; storage unit 908, such as a magnetic disk and an optical disk; and communication unit 909, such as a network card, a modem, and a wireless communication transceiver. Communication unit 909 allows device 900 to exchange information/data with other devices through a computer network such as the Internet and/or various telecommunication networks.

The various processes and processing described above, such as method 300, may be performed by processing unit 901. For example, in some implementations, method 300 may be implemented as a computer software program that is tangibly included in a machine-readable medium, such as storage unit 908. In some implementations, part or all of the computer program may be loaded and/or installed onto device 900 via ROM 902 and/or communication unit 909. One or more steps of method 300 described above may be performed when the computer program is loaded into RAM 903 and executed by CPU 901. Alternatively, in other implementations, CPU 901 may also be configured in any other suitable manner to implement the above processes/methods.

According to an example implementation of the present disclosure, an electronic device is provided, including: at least one processor; a volatile memory; and a memory coupled to the at least one processor, the memory having instructions stored therein, wherein the instructions, when executed by the at least one processor, cause the device to execute a method for managing data patterns. This method includes: acquiring multiple sets of data patterns respectively associated with multiple collection devices, wherein a set of data patterns in the multiple sets of data patterns represent patterns of duplicate data in data from one of the multiple collection devices; dividing the multiple collection devices into multiple groups based on clusters of the multiple sets of data patterns; and determining, based on sets of data patterns associated with collection devices in a group in the multiple groups, a set of shared data patterns for sharing among the collection devices in the group.

According to an example implementation of the present disclosure, dividing the multiple collection devices into the multiple groups includes: generating respectively multiple pattern features of the multiple sets of data patterns based on the multiple sets of data patterns; and dividing the multiple collection devices into the multiple groups based on the multiple pattern features.

According to an example implementation of the present disclosure, generating respectively the multiple pattern features of the multiple sets of data patterns includes: for one set of data patterns in the multiple sets of data patterns, generating a pattern feature of the set of data patterns based on data patterns in the set of data patterns and the numbers of occurrences of the data patterns in the data. According to an example implementation of the present disclosure, dividing the multiple collection devices into the multiple groups includes: converting respectively the multiple pattern features to multiple low-dimensional features, wherein dimensions of the multiple low-dimensional features are lower than those of the multiple pattern features; and determining the multiple groups based on clusters of the multiple low-dimensional features.

According to an example implementation of the present disclosure, determining the set of shared data patterns includes:

determining respectively the numbers of occurrences of data patterns in the sets of data patterns in data from the collection devices in the group; and determining the set of shared data patterns based on the numbers of occurrences.

According to an example implementation of the present disclosure, determining the set of shared data patterns includes: determining the set of shared data patterns based on an intersection of the sets of data patterns.

According to an example implementation of the present disclosure, acquiring the multiple sets of data patterns includes: acquiring a set of initial data patterns associated with the collection device; ranking the set of initial data patterns based on the numbers of occurrences of the set of initial data patterns in the data; and selecting the set of data patterns associated with the collection device based on the ranked set of initial data patterns.

According to an example implementation of the present disclosure, the multiple collection devices are located in an edge network in an application environment, and the method is executed at a computing device in the network.

According to an example implementation of the present disclosure, the method further includes: distributing the set of shared data patterns to an edge computing device in the edge network, wherein the edge computing device is connected to a target collection device in the multiple collection devices in the group; and instructing the edge computing device to generate de-duplicated data of target data from the target collection device based on the set of shared data patterns.

According to an example implementation of the present disclosure, the method further includes: instructing the edge computing device to transmit the de-duplicated data to a server device that is used to process the target data.

According to an example implementation of the present disclosure, a computer program product is provided, which is tangibly stored on a non-transitory computer-readable medium and includes machine-executable instructions, wherein the machine-executable instructions are used to perform the method according to the present disclosure.

According to an example implementation of the present disclosure, a computer-readable medium is provided. The computer-readable medium stores machine-executable instructions that, when executed by at least one processor, cause the at least one processor to implement the method according to the present disclosure.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages, such as Smalltalk and C++, and conventional procedural programming languages such as the C language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, for example, a programmable logic circuit, a field programmable gate array (FPGA), or a programmable logic array (PLA), is personalized by utilizing state information of the computer-readable program instructions, wherein the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or block diagrams and combinations of blocks in the flow charts and/or block diagrams can be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various implementations of the present disclosure have been described above. The above description is illustrative and not exhaustive, and is not limited to the various implementations disclosed. Numerous modifications and alterations are apparent to persons of ordinary skill in the art without departing from the scope and spirit of the illustrated implementations. The selection of terms as used herein is intended to best explain principles and practical applications of the various implementations or improvements to technologies on the market, or to enable other persons of ordinary skill in the art to understand the implementations disclosed here.

The invention claimed is:

1. A method for managing data patterns, including:
acquiring multiple sets of data patterns respectively associated with multiple collection devices, wherein the multiple collection devices are located in an edge network in an application environment, and wherein a set of data patterns in the multiple sets of data patterns represent patterns of duplicate data in data from one of the multiple collection devices;
generating, based on the multiple sets of data patterns, multiple pattern features, wherein each one of the pattern features is generated for a respective set of data patterns in the multiple sets of data patterns, and wherein each pattern feature includes a number of occurrences of each individual data pattern in the respective set of data patterns;

dividing the multiple collection devices into multiple groups based on the pattern features;

determining, based on the numbers of occurrences of data patterns included in sets of data patterns associated with collection devices in a group in the multiple groups, a set of shared data patterns for sharing among the collection devices in the group;

distributing the set of shared data patterns to an edge computing device in the edge network, wherein the edge computing device is connected to a target collection device in the multiple collection devices in the group;

instructing the edge computing device to generate de-duplicated data of target data from the target collection device based on the set of shared data patterns, wherein the de-duplicated data is smaller than the target data;

instructing the edge computing device to transmit the de-duplicated data to a server device that is used to process the target data; and whereby transmission of the de-duplicated data to the server device reduces overhead of storage resources involved in data storage by the server device.

2. The method according to claim 1, wherein dividing the multiple collection devices into the multiple groups includes:

converting respectively the multiple pattern features to multiple low-dimensional features, wherein dimensions of the multiple low-dimensional features are lower than those of the multiple pattern features; and determining the multiple groups based on clusters of the multiple low-dimensional features.

3. The method according to claim 1, wherein determining the set of shared data patterns further includes: determining the set of shared data patterns based on an intersection of the sets of data patterns.

4. The method according to claim 1, wherein acquiring the multiple sets of data patterns includes:

acquiring a set of initial data patterns associated with the collection device;

ranking the set of initial data patterns based on the numbers of occurrences of the set of initial data patterns in the data; and selecting the set of data patterns associated with the collection device based on the ranked set of initial data patterns.

5. The method according to claim 1, wherein the server device is located in a core network separate from the edge network; and whereby transmission of the de-duplicated data to the server device further reduces bandwidth requirements between the edge network and the core network.

6. An electronic device, including:

at least one processor;

a volatile memory; and a memory coupled to the at least one processor, wherein the memory has instructions stored therein that, when executed by the at least one processor, cause the device to perform a method for managing data patterns, the method including:

acquiring multiple sets of data patterns respectively associated with multiple collection devices, wherein the multiple collection devices are located in an edge network in an application environment, and wherein a set of data patterns in the multiple sets of data patterns represent patterns of duplicate data in data from one of the multiple collection devices;

generating, based on the multiple sets of data patterns, multiple pattern features, wherein each one of the pattern features is generated for a respective set of data patterns in the multiple sets of data patterns, and wherein each pattern feature includes a number of occurrences of each individual data pattern in the respective set of data patterns;

dividing the multiple collection devices into multiple groups based on the pattern features;

determining, based on the numbers of occurrences of data patterns included in sets of data patterns associated with collection devices in a group in the multiple groups, a set of shared data patterns for sharing among the collection devices in the group;

distributing the set of shared data patterns to an edge computing device in the edge network, wherein the edge computing device is connected to a target collection device in the multiple collection devices in the group;

instructing the edge computing device to generate de-duplicated data of target data from the target collection device based on the set of shared data patterns, wherein the de-duplicated data is smaller than the target data;

instructing the edge computing device to transmit the de-duplicated data to a server device that is used to process the target data; and whereby transmission of the de-duplicated data to the server device reduces overhead of storage resources involved in data storage by the server device.

7. The device according to claim 6, wherein dividing the multiple collection devices into the multiple groups includes:

converting respectively the multiple pattern features to multiple low-dimensional features, wherein dimensions of the multiple low-dimensional features are lower than those of the multiple pattern features; and determining the multiple groups based on clusters of the multiple low-dimensional features.

8. The device according to claim 6, wherein determining the set of shared data patterns further includes: determining the set of shared data patterns based on an intersection of the sets of data patterns.

9. The device according to claim 6, wherein acquiring the multiple sets of data patterns includes:

acquiring a set of initial data patterns associated with the collection device;

ranking the set of initial data patterns based on the numbers of occurrences of the set of initial data patterns in the data; and selecting the set of data patterns associated with the collection device based on the ranked set of initial data patterns.

10. The electronic device according to claim 6, wherein the server device is located in a core network separate from the edge network; and whereby transmission of the de-duplicated data to the server device further reduces bandwidth requirements between the edge network and the core network.

11. A computer program product having a non-transitory computer readable medium which stores a set of instructions to manage data patterns; the set of instructions, when carried out by computerized circuitry, causing the computerized circuitry to perform a method of:

acquiring multiple sets of data patterns respectively associated with multiple collection devices, wherein the multiple collection devices are located in an edge network in an application environment, and wherein a set of data patterns in the multiple sets of data patterns represent patterns of duplicate data in data from one of the multiple collection devices;

generating, based on the multiple sets of data patterns, multiple pattern features, wherein each one of the pattern features is generated for a respective set of data patterns in the multiple sets of data patterns, and wherein each pattern feature includes a number of occurrences of each individual data pattern in the respective set of data patterns;

dividing the multiple collection devices into multiple groups based on the pattern features;

determining, based on the numbers of occurrences of data patterns included in sets of data patterns associated with collection devices in a group in the multiple groups, a set of shared data patterns for sharing among the collection devices in the group;

distributing the set of shared data patterns to an edge computing device in the edge network, wherein the edge computing device is connected to a target collection device in the multiple collection devices in the group;

instructing the edge computing device to generate de-duplicated data of target data from the target collection device based on the set of shared data patterns, wherein the de-duplicated data is smaller than the target data;

instructing the edge computing device to transmit the de-duplicated data to a server device that is used to process the target data; and whereby transmission of the de-duplicated data to the server device reduces overhead of storage resources involved in data storage by the server device.

* * * * *